United States Patent
Kraus

[11] Patent Number: 5,816,543
[45] Date of Patent: Oct. 6, 1998

[54] HOLDING ELEMENT

[75] Inventor: Willibald Kraus, Grunstadt, Germany

[73] Assignee: TRW United-Carr GmbH & Co. KG, Enkenbach-Alsenborn, Germany

[21] Appl. No.: 591,160

[22] Filed: Jan. 25, 1996

[30] Foreign Application Priority Data

Feb. 8, 1995 [DE] Germany .......................... 195 04 114.3
Apr. 26, 1995 [DE] Germany .......................... 195 15 409.6

[51] Int. Cl.⁶ ............................................. F16L 3/00
[52] U.S. Cl. ........................... 248/73; 411/505; 249/74.1; 249/74.3
[58] Field of Search ............................ 248/71, 73, 74.1, 248/74.3, 69; 411/508, 544, 542

[56] References Cited

U.S. PATENT DOCUMENTS

| | | | |
|---|---|---|---|
| 2,937,834 | 5/1960 | Orenick et al. | 248/71 |
| 2,969,216 | 1/1961 | Hallsey | 248/71 |
| 2,974,916 | 6/1961 | Richey | 248/71 |
| 3,126,183 | 3/1964 | Hopkins | 248/73 |
| 3,144,695 | 8/1964 | Budwig | 24/213 |
| 3,341,903 | 9/1967 | Buntic | 24/16 |
| 3,552,696 | 1/1971 | Crenick | 248/68 |
| 3,758,060 | 9/1973 | Schuplin | 248/74 |
| 4,236,280 | 12/1980 | Kreiseder | 24/16 |
| 4,334,659 | 6/1982 | Yuda | 248/73 |
| 4,342,438 | 8/1982 | Speedie | 248/73 |
| 4,561,153 | 12/1985 | Matsui | 24/16 |
| 4,705,245 | 11/1987 | Osada | 248/71 |
| 4,784,358 | 11/1988 | Kohut | 248/73 |
| 4,866,816 | 9/1989 | Caveney | 24/16 |
| 4,919,373 | 4/1990 | Caveney et al. | 248/74.3 |
| 5,131,613 | 7/1992 | Kamiya et al. | 248/71 |

FOREIGN PATENT DOCUMENTS

323082 A1  8/1981  Germany .
873304     7/1961  United Kingdom .

*Primary Examiner*—Leslie A. Braun
*Assistant Examiner*—Kimberly Wood Ku
*Attorney, Agent, or Firm*—Fay, Sharpe, Beall, Fagan, Minnich & McKee

[57] ABSTRACT

The invention relates to a holding element made of plastic for attachment of at least one tube-shaped body to a support. The element comprises an attachment zone 1, joinable with the support, and a band-shaped holding zone 2 functioning to encircle the tube-shaped body and provided with a locking device 3 connectable with a cooperating locking device 4 of the attachment zone 1. According to the invention, the locking device 3 includes a ring 5 which can be slid onto a cooperating locking device 4 comprising a plug area 6 having a collar 7.

11 Claims, 4 Drawing Sheets

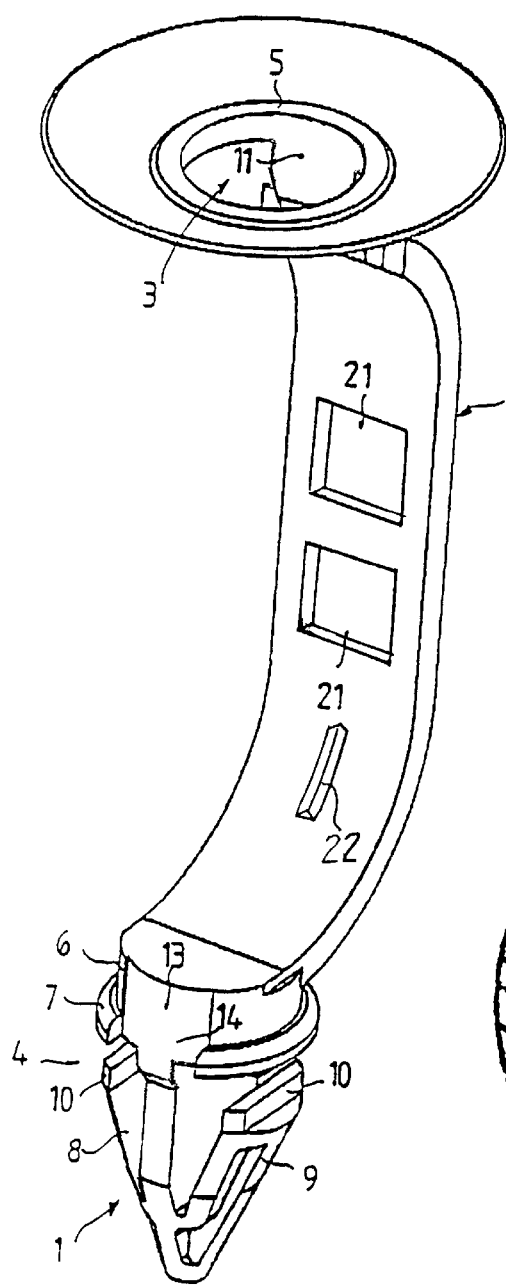
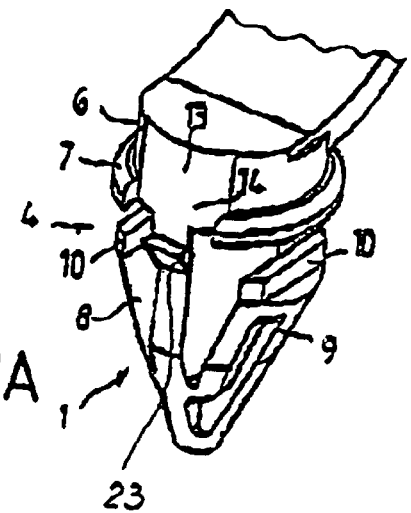
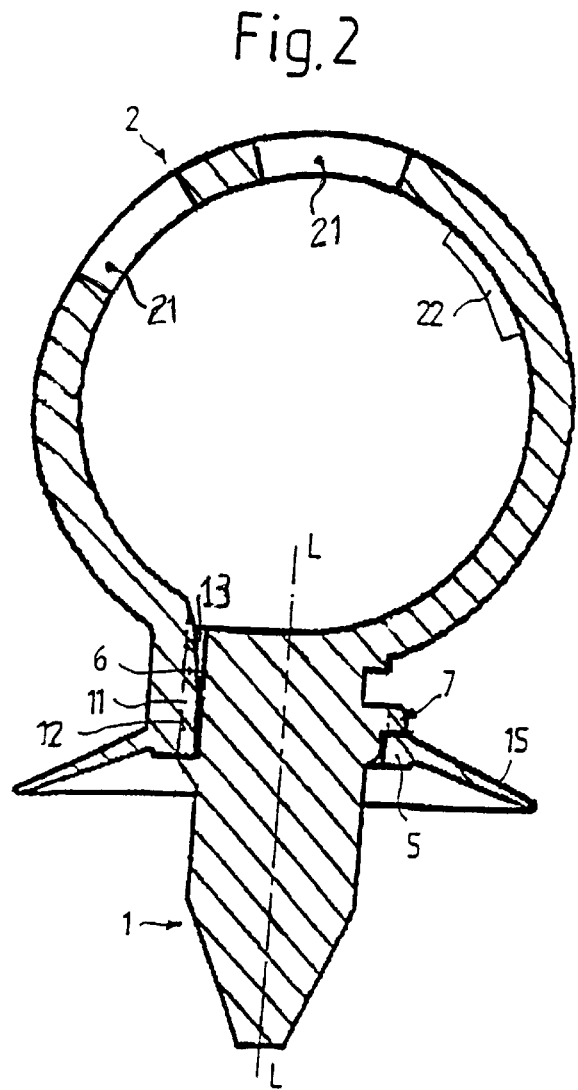

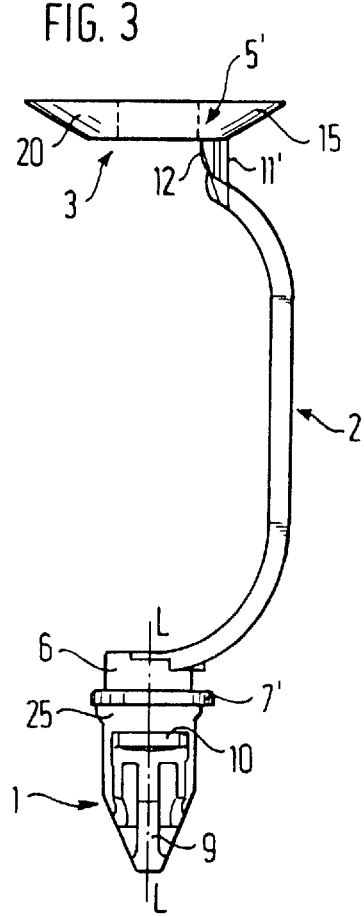
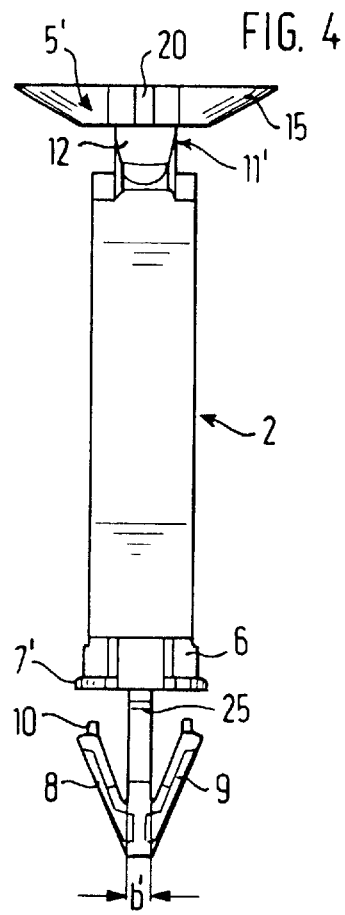
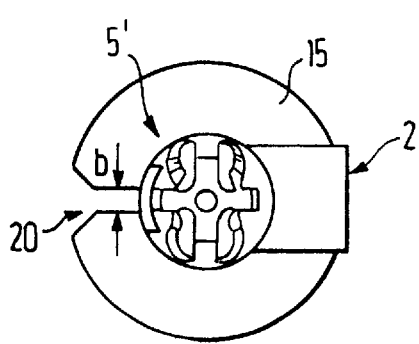
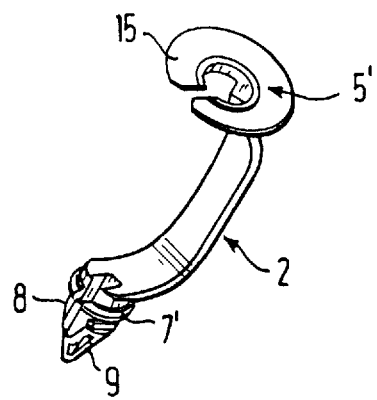

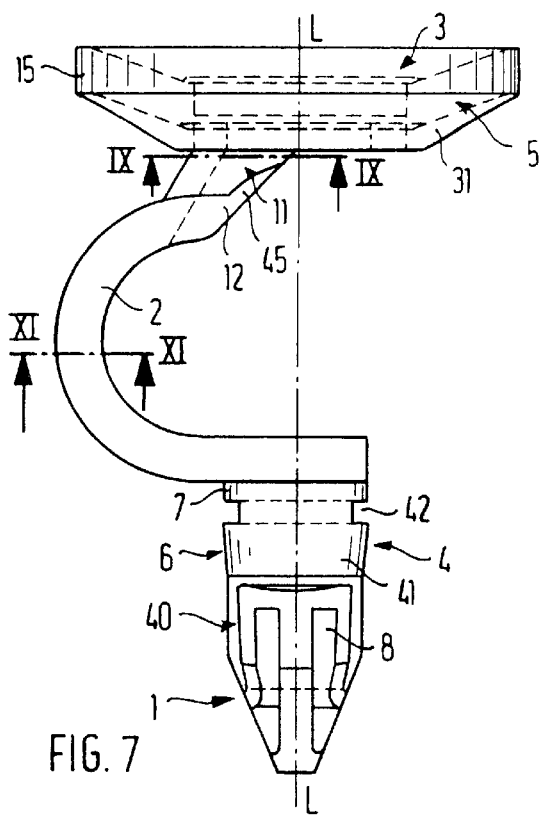
FIG. 7
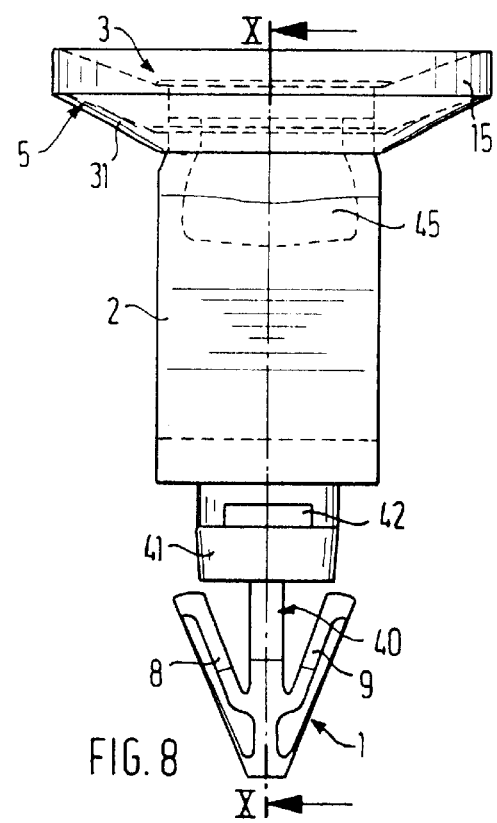
FIG. 8
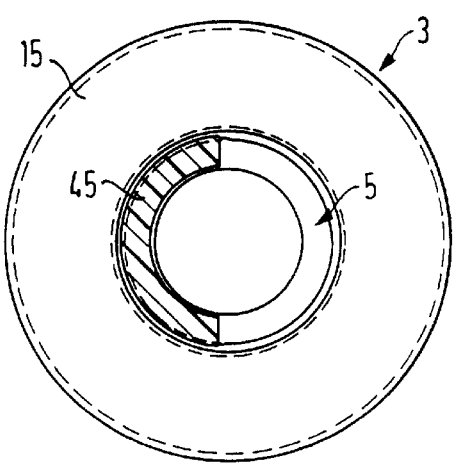
FIG. 9
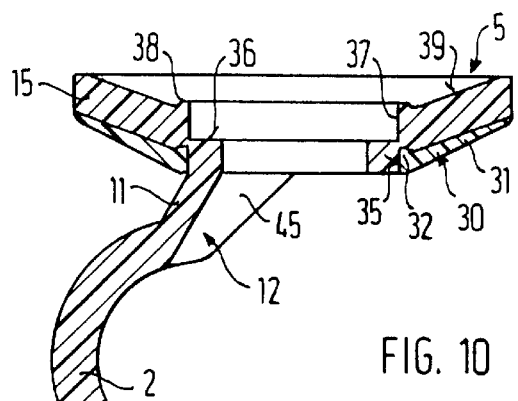
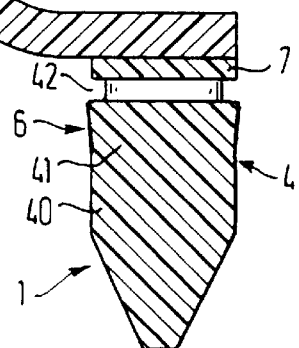
FIG. 10

FIG. 12 FIG. 13
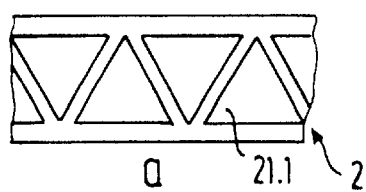
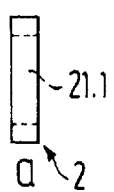
a
FIG. 11 a
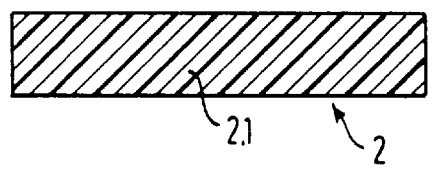
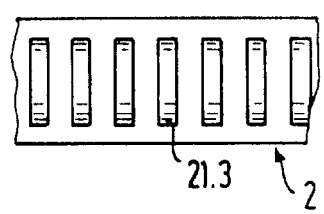
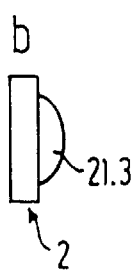
b
b
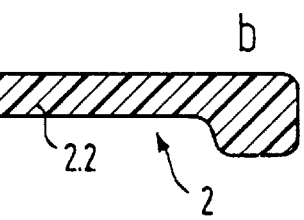
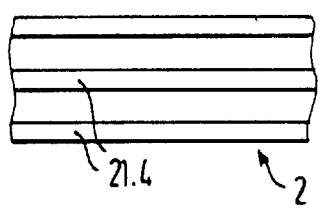
c
c
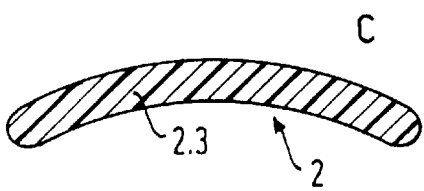
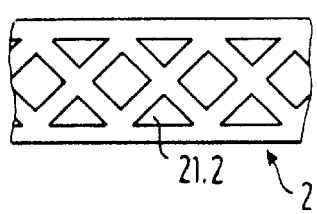
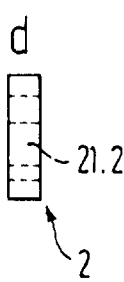
d
d
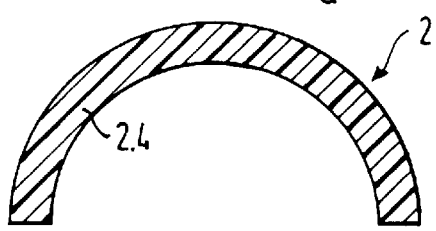
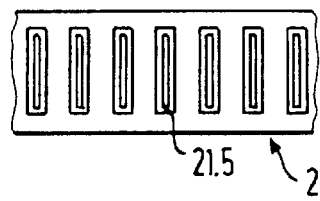
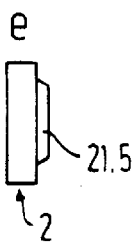
e

HOLDING ELEMENT

BACKGROUND OF THE INVENTION

The subject invention relates to a plastic holding element for attaching at least one tube-shaped body to a support. The element includes an attaching zone connectable with the support and a band-shaped holding zone having a locking device connectable with a cooperating locking device on the attaching zone.

A holding element of this general type is known in the prior art (DE 42 25 742 A1). This prior device is designed such that the locking device and a cooperating locking device are formed at opposite ends of a band-shaped holding zone. In mounting position, the locking device is embedded in the cooperating locking device and the entire unit is thus insertable in a support. With this known construction, the installation, i.e., the insertion of the locking device into the cooperating locking device, must be done with precision in order to guarantee trouble-free closing of the holding element prior to its insertion in an aperture of a support.

Also known in the prior art is a holding element made of plastic (GB 1 022 820) whose band-shaped holding zone covers the tube-shaped body in yoke-like fashion and which then engages via a stop element with the cooperating locking device. In this case, there may exist the risk of the locking device and the cooperating locking device detaching themselves from each other so that satisfactory attachment of the tube-shaped body is no longer guaranteed.

Further known in the prior art is a holding element (GB 2 187 255 A) in which a band-shaped holding zone, after looping around a tube-shaped body, engages with a cone-shaped plug which, in turn, is to be fastened to a support. This results in relatively complicated handling of the entire unit during opening or closing of the holding element.

In contrast thereto, the objective of the present invention is the design of a holding element of the above-mentioned type that has a simple construction and guarantees rapid installation and, further, wherein the closed holding element, even when subjected to relatively large stresses, can securely encase different tube-shaped bodies.

According to one specific embodiment of the invention, the holding element has a locking device that comprises a ring which can have a closed shape and which can be slidable onto a plug of the attaching zone in the direction of the longitudinal axis of the attaching zone. A collar on the plug serves as a stop for the ring.

Alternatively, there exists the possibility that the ring can be equipped with a transverse slot and is laterally slidable onto the plug, crosswise to the longitudinal axis. In both instances, rapid installation is guaranteed. Additionally, in closed position, the tube-shaped body is securely attached to a support by means of the holding element.

It is further contemplated that the ring include a circumferential sealing lip so that the support aperture is covered.

According to another specific embodiment, the band-shaped holding zone and the ring can comprise a soft material, whereas the attachment zone and the upper surface of the ring facing the band-shaped holding zone are manufactured from a harder material. The holding element, in such an arrangement, is produced in known fashion by two-component extrusion process. Due to the construction of the ring of the softer material, there is achieved an automatic sealing effect vis-a-vis the attachment zone.

The upper surface of the ring can be as a disk to can cover the entire area of the ring and have a lesser material thickness than the ring. In this arrangement, the inner circumference of the disk can have a shoulder which embeds itself in a recess of the ring.

Additional refinements will be evident from the subclaims.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

The invention is described hereinafter by means of exemplary embodiments represented in the drawing wherein:

FIG. 1 is a perspective view in open position of a holding element according to the invention;

FIG. 2 is a cross-sectional view of the holding element according to FIG. 1 in its assembled installation condition;

FIG. 2A is a partial perspective view similar to FIG. 1 showing another specific embodiment of the holding element in open position;

FIG. 3 is a side elevational view of another specific embodiment of the holding element according to the invention;

FIG. 4 is a front elevational view of the holding element of FIG. 3;

FIG. 5 is a top plan view of the holding element of FIGS. 3 and 4;

FIG. 6 is a perspective view of the holding element according FIGS. 3 to 5 in opened position;

FIG. 7 is a side elevational view of another specific embodiment of the invention;

FIG. 8 is a front elevational view of the embodiment of FIG. 7;

FIG. 9 is a cross-sectional view taken on line IX—IX of FIG. 7;

FIG. 10 is a cross-sectional view taken on line X—X of FIG. 8;

FIGS. 11a through 11d shows various cross-section shapes for the band-shaped holding zone;

FIGS. 12a–12e are plan views of various shapes for the band-shape hold zone; and, FIGS. 13a–13e are end view of FIGS. 12a–12e, respectively.

DETAILED DESCRIPTION OF THE PREFERRED AND ALTERNATE EMBODIMENTS

Referring now to the drawings wherein the showings are for the purposes of illustrating the preferred and alternate embodiments of the invention only and not for purposes of limiting same, FIGS. 1 and 2 show a first version of a holding element made of plastic for fastening at least one tube-shaped body to a support (not shown). The holding element has an attachment zone 1 connectable with a support aperture and an elastic band-shaped holding zone 2 for encircling the tube-shaped body. At its end, the band-shaped holding zone 2 has a locking device 3 which is suitable for being connected with a cooperating locking device of the attachment zone 1.

As is apparent from FIGS. 1 and 2, the locking device comprises a closed ring 5, which is slidable onto a cooperating locking device 4 that includes a plug area 6 with a radially extending collar 7. As a result, there exists the possibility, after encircling a tube-shaped body with the holding zone 2, of sliding the ring 5 onto the plug area 6 from below in the direction of the longitudinal axis L—L (see FIG. 2), that is to say, sliding it as far as is necessary until the collar 7 serves as stop for ring 5. Due to the tension of the elastic band-shaped holding zone 2, the holding element remains in its assembled position, i.e., closed position.

In the exemplary embodiment according to FIGS. 1 and 2, the fastening element has two V-shaped spring arms 8 and 9 mounted in opposed relationship and having their upper ends provided with support engaging steps 10. The spring arms 8, 9 are radially flexible and move back to their position shown in FIG. 1 after installing them in a support aperture. Thus, the holding element according to the invention is secured in its closed form of FIG. 2 in the support aperture.

As is apparent from FIG. 2, in the closed form for mounting in the support aperture, ring 5 is located between the end areas of the spring arms 8 and 9 and the collar 7. Furthermore, if desired, the plug area 6 can be equipped with a stop nose or latch element 23, in accordance with FIG. 2A, which positions itself in closed position behind the ring 5 and which thereby correctly arrests same.

In lieu of the opposing spring arms 8, 9, presented in FIG. 1, other holding elements are also possible by means of which the part is attachable to a support in accordance with the invention.

From FIG. 1, it can be seen that the holding zone 2 can be equipped with window-like apertures 21. In order to make, on the one hand, the fastening of a band-shaped body functionally secure and, on the other hand, to attach the holding element represented in mounting position in FIG. 2 securely to a support, it is of benefit if the band-shaped holding zone 2 is designed to be more flexible and resilient than the attachment zone 1 and the plug region 6. A two-component extrusion process can be employed, whereby the holding zone 2 can comprise a more elastic material component than the attaching zone 1 and the ring 5 which can be manufactured out of a rigid material.

It is apparent from FIG. 1 that ring 5 is adjacent to a neck 11 which joins to the elastic holding zone 2. In this arrangement, the neck 11 (as seen in FIG. 2) can have a guide 12 on the inside for the plug area 6 of cooperative locking device 4. Thus, in the mounting position, the entire unit is in itself stable. In addition, the collar 7 and the plug area 6 (see FIGS. 1 and 2) can each be equipped with a recess 13 and 14, arranged opposite the band-shaped holding zone 2.

With respect to the design of the ring, it can be constructed in such manner it joins to a circumferential and radially extending sealing lip 15. Because of the circumferential sealing lip 15, the aperture in which the holding element is mounted is correctly covered and safely protected from dirt.

If, for example, a tube-shaped body having radial fins is to be fastened, which is equipped with, the possibility exists that the holding zone 2 can have at least one stop nose 22 at its inner circumference which is suitable for engaging with the corresponding counter-profile of the tube-shaped body and to hold it securely in place against any risk of sliding.

In the specific embodiment according to FIGS. 1 and 2, the ring 5 has a circumferential closed form.

In accordance with FIGS. 3 to 6, however, there is also the possibility that a ring 5' can be equipped with a transverse slot 20 and can be slid crosswise to longitudinal axis L—L on the plug area 6. The plug area 6 beneficially exhibits in such an arrangement a collar 7' which serves for locking the slotted ring 5' in mounting position and which joins on the underside into a cross-piece 25. The width b' of cross-piece 25 in such arrangement is smaller than the width b of slot 20 (see FIGS. 4 and 5).

Similarly to the specific embodiment according to FIGS. 1 and 2, ring 5' can be adjacent to a neck 11, which joins the band-shaped holding zone 2, whereby, on the inside, there is provided a guide for the plug area in mounting position. This also results in a unit which is stable in itself and which after being placed in mounting position can be correctly attached to a support.

Identically to the specific embodiment according to FIGS. 1 and 2, the attachment zone 1 can have two V-shaped elastic spring arms 8, 9 mounted in opposing relationship. The upper end regions of arms 8, 9 include the previously-mentioned support engaging steps 10. Alternatively, however, the possibility also exists of designing the attachment area differently.

With the specific embodiment according to FIG. 3 to 5, the ring 5' can join to a circumferential sealing lip 15 so that when in mounting position, the support aperture is protected from becoming dirty.

In the specific embodiment according to FIG. 3 to 5, it is beneficial that the holding zone 2 be designed to be more elastic than the attaching zone 1 and the ring 5. In this arrangement as well, there exists the possibility of form the element using a two-component extrusion system. Similarly to the specific embodiment according to FIGS. 1 and 2, the band-shaped holding zone 1 has at least one stop nose on the interior in order to fasten a band-shaped body, equipped with cross-profiles such as fins securely against risk of displacement.

With the preceding specific embodiments, the holding zone 2 is designed to have greater elasticity than the attaching zone 1 and the ring 5. According to FIGS. 7 to 10, it is possible that the band-shaped holding zone 2 (for example, semi-circular or straight) and the ring 5 with sealing lip 15 can be manufactured from a soft resilient and elastic material component, whereas the fastening zone and the surface 30 of ring 5, facing the band-shaped holding zone 2, can comprise a harder material component. In this arrangement, and in accordance with FIG. 10, the surface 30 can be designed as a disk 31 and can cover, for reinforcement purposes, the entire area of the ring 5. The inner circumference of disk 31 can have a shoulder 32 which embeds itself in a recess 35 of ring 5. It is, moreover, apparent from FIG. 10 that disk 31 can decrease in thickness from the inner circumference to the outer periphery.

With the specific embodiment of the invention according to FIGS. 7 to 10, the ring 5 is designed as a circumferential sealing element 15, and comprises a softer material component than the disk 31, and excellent sealing effect of the holding element 1 in closed position is achieved. Namely, in the position in which the cooperating locking device 4 is inserted in the central aperture of the closed ring 5, there is a seal between the interior of the ring and the exterior of the plug 6.

In this arrangement, the aperture of ring 5 can have with the cooperating locking device 4 an interacting shoulder 36 followed by a cylindrical wall 37 which is delineated by a circumferential collar 38. At the inner side of ring 5, the collar 38 transitions into a conical surface 39.

It is apparent from FIG. 7 and 10 that, in the area of ring 5, the band-shaped holding zone 2 has the shape of a semi-circle 45 to act as a guide 12 for holder 11. In this arrangement, the semi-circular form 45 can have a conical shape advancing toward the ring 5 to thereby effecting a guide during mounting of cooperating locking device 4 within the central aperture of ring 5.

The cooperative locking device 4, according to FIGS. 8 and 10, can comprise a cross-piece area 40 and an adjoining truncated cone 41. In the truncated cone 41, there may be present a milled-out slot 42 which acts as a mounting aid. For example, a plug, which is not more precisely identified, can project into said slot, as a result of which the entire holding element according to the invention shall simply be inter-positioned prior to mounting.

FIGS. 11a to 11d show that the band-shaped holding zone 2 can be designed in cross-section, rectangular (2.1), arched (2.3), equipped with lateral cross-pieces (2.2), and rounded (2.4). Thus, excellent adaptation to different conditions is possible.

The band-shaped holding zone can be equipped according to FIG. 1 with window-like recesses 21. While these window-like recesses 21 have a rectangular shape, the possibility exists, according to FIGS. 12a and 12d, and 13a and 13d, that these recesses 21.1 and 21.2 have the shape of a triangle.

According to FIGS. 12b and 12e, and 13b and 13e, the band-shaped holding zone 2 can also be equipped with cross-pieces 21.3 or 21.5, which have either rounded or oblique or rectangular form. Instead of these cross-pieces, there also exists the possibility according to FIGS. 12c and 13c to provide at least one longitudinal strip 21.4 whereby the holding zone 2 attains additional stability and guidance.

In the specific embodiment according to FIGS. 7 to 10, the ring 5 has a closed shape and performs a sealing function due to the soft material component. There also exists the possibility that this ring, similar to the construction form in accordance with FIGS. 5 and 6, can be equipped with a slot 20. Here, as well, similar to the aforementioned construction according to FIGS. 7 to 10, excellent sealing is likewise obtained if said ring is made of a soft material component and is covered by a thin disk 31 according to FIG. 10.

All specific embodiments in the drawings have in common that the fastening zone 1 comprises two V-shaped elastic spring arms 8, 9 (FIGS. 1, 4, and 8) which are oppositely disposed and are equipped with a notch or step on their upper end areas for engaging the support aperture. Alternatively, there also exists the possibility of providing, instead of the two spring arms, a so-called "pine tree bolt" area or to constructively change the attaching zone to other known designs.

Based on the invention, there results a plastic holding element 1 which can be mounted quickly and easily and which can be connected with a support after looping around a tube-shaped body. Owing to the fact that in the mounted position ring 5 or 5' interacts with plug area 6, an excellent sealed holder results and unintentional opening is avoided, even with substantial stresses, such as they may, for example, occur in the motor vehicle industry.

The invention has been described with reference to the preferred and alternate embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a holding element made of plastic for fastening at least one tube-shaped body to a support and including an attachment zone connectable with a support and a band-shaped holding zone for encircling the tube-shaped body and having a locking device that is joinable with a cooperating locking device of the attachment zone, the improvement wherein the locking device comprises a ring which can be slid onto the cooperating locking device comprising a plug having a collar and wherein the ring is equipped with a traversing slot and can be slid onto the plug crosswise to a longitudinal of the plug axis.

2. A holding element as defined in claim 1 wherein the collar serves for locking the slotted ring in mounting position.

3. A holding element according to claim 1 wherein the ring includes a circumferential sealing lip and a neck which joins to the band-shaped holding zone and which has an internal guide for the plug.

4. A holding element as defined in claim 1 wherein the underside of the collar has a cross-piece whose width is smaller than the width of the slot.

5. In a holding element made of plastic for fastening at least one tube-shaped body to a support and including an attachment zone connectable with a support and a band-shaped holding zone for encircling the tube-shaped body and having a locking device that is joinable with a cooperating locking device of the attachment zone, the improvement wherein the locking device comprises a ring which can be slid onto the cooperating locking device comprising a plug having a collar and wherein the band-shaped holding zone and the ring are formed of a soft material and the attachment zone is formed of a harder material and, the ring further having a top surface provided with a disk positioned over the top surface, the disk being of lesser material thickness than said ring.

6. A holding element as defined in claim 1 wherein the disk has an inner circumference with a shoulder positionable into a recess of the ring.

7. A holding element as defined in claim 1 wherein the disk has a thickness which decreases from the inner circumference to the outer periphery.

8. A holding element as defined in claim 5 wherein the ring has a shoulder which interacts with the cooperating locking device with the shoulder being adjacent to a cylindrical wall delineated by the collar.

9. A holding element as defined in claim 8 wherein the collar joins on the inside of the ring into a conical surface.

10. In a holding element made of plastic for fastening at least one tube-shaped body to a support and including an attachment zone connectable with a support and a band-shaped holding zone for encircling the tube-shaped body and having a locking device that is joinable with a cooperating locking device of the attachment zone, the improvement wherein:

the locking device comprises a ring which can be slid onto the cooperating locking device comprising a plug having a collar;

the band-shaped holding zone and the ring are formed of a soft material and the attachment zone is formed of a harder material;

the ring has a shoulder which interacts with the cooperating locking device with the shoulder being adjacent to a cylindrical wall delineated by the collar; and, the ring further having a top surface provided with a disk positioned over the top surface, the disk having a lesser material thickness than said ring;

the cooperating locking device includes a cross-piece and an adjoining truncated cone.

11. In a holding element made of plastic for fastening at least one tube-shaped body to a support and including an attachment zone connectable with a support and a band-shaped holding zone for encircling the tube-shaped body and having a locking device that is joinable with a cooperating locking device of the attachment zone, the improvement wherein: the locking device comprises a ring which can be slid into the cooperating locking device comprising a plug having a collar;

the band-shaped holding zone and the ring are formed of a soft material and the attachment zone is formed of a harder material;

the ring being provided with a transverse slot for adapting the ring to be slid onto the plug crosswise to a longitudinal axis of the plug;

the ring has a shoulder which interacts with the cooperating locking device with the shoulder being adjacent to a cylindrical wall delineated by the collar; and, the cooperating locking device includes a cross-piece and an adjoining truncated cone which has a slot.

* * * * *